(12) United States Patent
Sasaki

(10) Patent No.: US 7,527,896 B2
(45) Date of Patent: May 5, 2009

(54) NONAQUEOUS ELECTROLYTE SECONDARY BATTERY

(75) Inventor: Takeshi Sasaki, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 192 days.

(21) Appl. No.: 10/574,932

(22) PCT Filed: Oct. 6, 2004

(86) PCT No.: PCT/JP2004/015093

§ 371 (c)(1),
(2), (4) Date: Apr. 7, 2006

(87) PCT Pub. No.: WO2005/036680

PCT Pub. Date: Apr. 21, 2005

(65) Prior Publication Data

US 2006/0286457 A1    Dec. 21, 2006

(30) Foreign Application Priority Data

Oct. 7, 2003    (JP) ............................... 2003-348728

(51) Int. Cl.
*H01M 4/50* (2006.01)
*H01M 4/52* (2006.01)

(52) U.S. Cl. ...................... 429/223; 429/224; 429/231.3

(58) Field of Classification Search ................. 429/223, 429/224, 231.1, 231.3
See application file for complete search history.

(56) References Cited

U.S. PATENT DOCUMENTS

2004/0076883 A1 * 4/2004 Aoshima et al. ............ 429/223

FOREIGN PATENT DOCUMENTS

| JP | 10-321224 A | 12/1998 |
|----|-------------|---------|
| JP | 2001-216965 A | 8/2001 |
| JP | 2001-266876 A | 9/2001 |
| JP | 2002-222648 A | 8/2002 |
| JP | 2002-313420 A | 10/2002 |
| JP | 2003-7345 A | 1/2003 |
| JP | 2003-17055 A | 1/2003 |
| JP | 2004-327246 A | 11/2004 |

OTHER PUBLICATIONS

International search Report dated Dec. 14, 2004.

* cited by examiner

*Primary Examiner*—Stephen J. Kalafut
(74) *Attorney, Agent, or Firm*—Sughrue Mion, PLLC

(57) ABSTRACT

A nonaqueous electrolyte secondary battery which comprises a positive electrode including particles of lithium-containing layered nickel oxide represented by a general formula $Li_aNi_xCo_yAl_zM_bO_2$, wherein $0.3 \leq a \leq 1.05$, $0.7 \leq x \leq 0.87$, $0.1 \leq y \leq 0.27$, $0.03 \leq z \leq 0.1$, $0 \leq b \leq 0.1$; M is at least one selected from metallic elements except Ni, Co and Al. In the binding energy of the oxygen 1s spectrum when measuring the particles by XPS, if the peak area appearing at 529 eV is set to D; the peak area appearing at 531 eV is set to E; oxygen concentration ratio is set to D/(D+E); and the oxygen concentration ratios at depths of L1 nm and L2 nm from the particle surface are respectively set to $\alpha_{L1}$ and $\alpha_{L2}$, the combination of L1 and L2 in which $(\alpha_{L2}-\alpha_{L1})/\alpha_{L2} \leq 0.1$, $L1 \leq 100$, $L2 \geq 500$ is present.

10 Claims, 5 Drawing Sheets

NONAQUEOUS ELECTROLYTE SECONDARY BATTERY

TECHNICAL FIELD

The present invention relates to nonaqueous electrolyte secondary batteries provided with a positive electrode which includes lithium-containing layered nickel oxide particles.

BACKGROUND ART

As electronic devices are rapidly reduced in size and weight, the demand is growing for batteries as a power source of electronic devices, secondary batteries which are small and lightweight, have high energy density and further, are repeatedly chargeable and dischargeable should be developed. Also, owing to environmental issues such as air pollution and the increase in carbon dioxide, an early practical application in an electric vehicle is anticipated. Therefore, there is a demand for the development of superior secondary batteries which have characteristics such as high efficiency, high power, high energy density and light weight.

As a secondary battery which satisfies these demands, the secondary battery which employs nonaqueous electrolyte has been put to practical use. The battery has several times higher energy density than a conventional battery which uses aqueous solution electrolyte. For example, a long-life, 4-volt class nonaqueous electrolyte secondary battery has been put to practical use. It employs lithium-containing layered cobalt oxide (hereinafter, Co-based compound), lithium-containing layered nickel oxide (hereinafter, Ni-based compound) or spinel-type lithium manganese composite oxide (hereinafter, Mn-based compound) for its positive electrode, and employs carbon material or the like which can absorb and release lithium for the negative electrode.

Among them, Ni-based compound, characterized in that its amount of the lithium which can be absorbed and desorbed within a potential range practically used in the nonaqueous electrolyte secondary battery (3.0-4.3V vs. Li/Li$^+$) is equal to or larger than the cases of Co-based compound and Mn-based compound, also thanks to its availability, has largely been developed, aiming at a high-capacity and low-cost battery.

As described in Japanese Patent Publication No. H10-092429A, Ni-based compound is inherently more difficult to form so as to produce in a large amount thereof having a homogeneous crystal structure, compared with Co-based compound, which has been widely adopted. Due to subsequent improvements, however, examples are recently reported in which Ni-based compound incorporated into an actual battery delivers excellent performance (see Journal of Power Sources 119-121 (2003) 859-864, 865-869).

DISCLOSURE OF THE INVENTION

However, even today, when improvements have advanced, since a battery using Ni-based compound for positive active material is subject to variation in performance, leaving concern about quality and reliability compared with a conventional battery, and making its actual commercialization is difficult.

Investigation of Ni-based compound from various angles in order to determine the cause of such a problem shows that battery performance varies greatly depending on slight differences in surface properties, which cannot be defined as general quality control items such as composition molar ratio, specific surface area, pH, bulk density, tap density, particle size distribution, impurity amount, particle shape and crystal structure.

Accordingly, an object of the present invention is to provide a nonaqueous electrolyte secondary battery having a large discharge capacity and excellent charge-discharge cycle characteristics by prescribing the surface properties of Ni-based compound particles which have a large impact on battery performance and by using a compound whose surface state is within the stipulated range for positive active material of the nonaqueous electrolyte secondary battery.

In order to achieve the above objective, the nonaqueous electrolyte secondary battery according to the present invention is a nonaqueous electrolyte secondary battery provided with a positive electrode including particles of lithium-containing layered nickel oxide represented by the general formula $Li_aNi_xCo_yAl_zM_bO_2$, in which $0.3 \leq a \leq 1.05$, $0.7 \leq x \leq 0.87$, $0.1 \leq y \leq 0.27$, $0.03 \leq z \leq 0.1$, $0 \leq b \leq 0.1$; M is at least one selected from metallic elements except Ni, Co and Al; in the binding energy of the oxygen 1s spectrum when measuring the particles by XPS, the peak area appearing at 529 eV is set to D and the peak area appearing at 531 eV is set to E; oxygen concentration ratio is set to $D/(D+E)$; and the oxygen concentration ratios at depths of L1 nm and L2 nm from the particle surface are respectively set to $\alpha_{L1}$ and $\alpha_{L2}$, in which case, the combination of L1 and L2 is present in which $(\alpha_{L2}-\alpha_{L1})/\alpha_{L2} \leq 0.1$, $L1 \leq 100$, $L2 \geq 500$.

According to the present invention, the composition of Ni-based compound particles is stipulated as a whole so that the improvement effect proposed by the conventional inventions is obtained. Also, a compound in which the chemical bond state of oxygen close to the particle surface is within a prescribed range is used for positive active material of the nonaqueous electrolyte secondary battery so that the interface resistance between the electrolyte and the Ni-based compound particle becomes small and charge-discharge repetition minimally increases the resistance, thereby bringing good battery performance for a long period. The present invention, which can consistently provide a nonaqueous electrolyte secondary battery superior in discharge capacity and life property to a conventional battery using Co-based compound, is of high industrial value.

PREFERRED MODE FOR CARRYING OUT THE INVENTION

Figure 1:
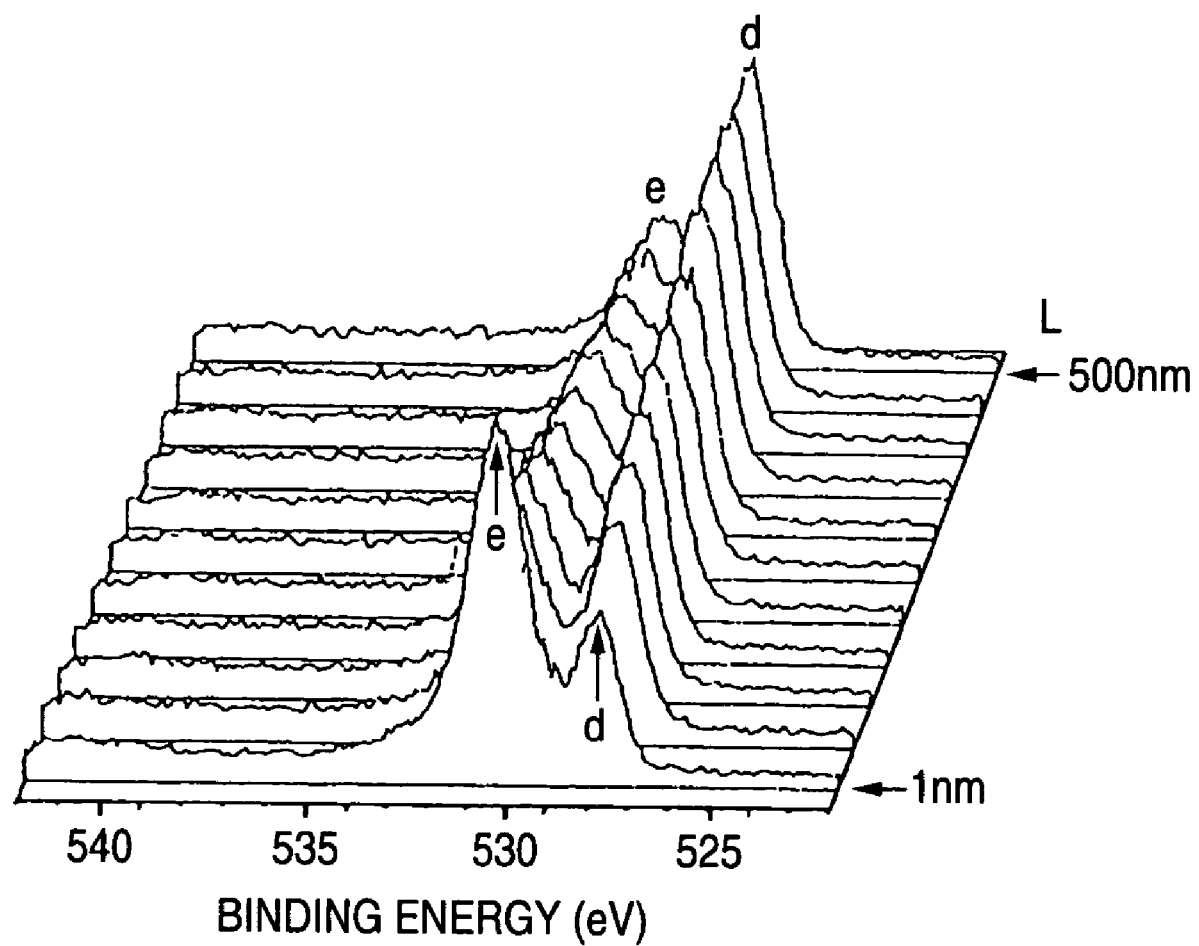
FIG. 1 shows a relation between a depth L (nm) from a particle surface and oxygen 1s spectrum in XPS spectrum.

A nonaqueous electrolyte secondary battery which uses particles of lithium-containing layered nickel oxide represented by the general formula $Li_aNi_xCo_yAl_zM_bO_2$ ($0.3 \leq a \leq 1.05$, $0.7 \leq x \leq 0.87$, $0.1 \leq y \leq 0.27$, $0.03 \leq z \leq 0.1$, $0 \leq b \leq 0.1$; and M is at least one selected from metallic elements except Ni, Co and Al) for positive active material is subject to variation in discharge capacity, power performance, preserving performance or the like in production lots. The present inventors investigated the cause in detail and clarified as follows: Even when the average composition of a compound as a whole is within the range stipulated by the above general formula, the chemical bond state of elements close to the compound surface is often disturbed. The reason remains unclear. Particularly, the variation in oxygen bond state is remarkable and corresponds to the variation in battery performance.

Consequently, the present inventors analyzed the surfaces of all the Ni-based compounds formed as a trial under the same conditions as were used in the past and selected a compound in which the oxygen concentration profile on the surface is within a prescribed range so as to obtain a large-capacity and long-life nonaqueous electrolyte secondary battery. Hereinafter, a description is given for a concrete mode of the nonaqueous electrolyte secondary battery according to the present invention.

The composition of lithium-containing layered nickel oxide particles used for positive active material in the present invention as a whole is represented by the general formula $Li_aNi_xCo_yAl_zM_bO_2$ ($0.3 \leq a \leq 1.05$, $0.7 \leq x \leq 0.87$, $0.1 \leq y \leq 0.27$, $0.03 \leq z \leq 0.1$, $0 \leq b \leq 0.1$; and M is at least one selected from metallic elements except Ni, Co and Al). In the lithium-containing layered nickel oxide particles, cobalt substitutes for a part of nickel, thereby suppressing change in crystal structure caused by charge-discharge process. Furthermore, trivalent stable aluminum is doped thereby giving more stability to the crystal structure. In this case, M is at least one selected from metallic elements except Ni, Co and Al, and a combination of a plurality of metallic elements may be employed.

In addition, when charging up to an area of a<0.3, there is a substantial change in c-axial length, thereby accelerating disintegration of the crystal structure and increasing polar plate resistance. Therefore, charging is detrimental up to such an area. Discharging, also for the same reason, within the range of $a \leq 1.05$ is preferable.

Furthermore, when x is less than 0.7, the discharge capacity decreases to be equivalent to a conventional nonaqueous electrolyte battery using a Co-based compound for positive active material. When exceeding 0.87, heat stability decreases extremely. Therefore, x is preferably within the range between 0.7-0.87. Also, when y is less than 0.1, the crystal structure becomes unstable. On the other hand, when y exceeds 0.27, the crystal structure reaches the limit of stabilization, only to cause a decrease in discharge capacity. Therefore, y is preferably with in the range between 0.1-0.27. When z is less than 0.03, the crystal structure becomes unstable and heat stability decreases in charging. However, when z exceeds 0.1, discharge capacity decreases extremely. Therefore, Z is preferably within the range between 0.03-0.1. In the present invention, $0.98 \leq x+y+z+b \leq 1.01$ is preferably valid. M is preferably a transition metal element except Ni and Co. For a transition metal element in this case, a combination of a plurality of transition metals may be used.

The reason for the variation in the concentration profile of oxygen close to the surface of lithium-containing layered nickel oxide particles remains unclear, but the following reasons are considered: due to insufficient mixture or large particle size of the raw material, a residue of unreacted raw material (lithium hydroxide or the like) is adhered to the compound surface after calcinations; a compound absorbs moisture or carbon dioxide so as to form a lithium compound (lithium carbonate or the like) on the surface and furthermore absorbs moisture in a solvent when manufacturing a battery so as to form a lithium compound; the calcination temperature is out of the correct range (depending on compositions, commonly 650-750° C.); and calcination time is too short. These reasons are considered to be due to the fact that it is inherently difficult to form a Ni-based compound and that the crystal structure itself is unstable.

Even when supervising the manufacturing method and storage method of a compound and controlling the quality of the finished product as described above with the full understanding that a Ni-based compound is difficult to form and has a relatively unstable crystal structure, the surface properties slightly vary in production lots and the variation in oxygen chemical bond state is often found from the surface toward the inside of the compound. Use of a compound whose surface properties depart from a stipulated value for positive active material results in manufacturing a battery unexpectedly poor in discharge capacity and life performance.

In order to avoid such situation, the nonaqueous electrolyte secondary battery of the present invention comprises a positive electrode including lithium-containing layered nickel oxide particles represented by the general formula $Li_aNi_xCo_yAl_zM_bO_2$ ($0.3 \leq a \leq 1.05$, $0.7 \leq x \leq 0.87$, $0.1 \leq y \leq 0.27$, $0.03 \leq z \leq 0.1$, $023 b \leq 0.1$; M is at least one selected from metallic elements except Ni, Co and Al). In the binding energy of the oxygen 1s spectrum when measuring the lithium-containing layered nickel oxide particles by XPS, if the peak area appearing at 529 eV is set to D; the peak area appearing at 531 eV is set to E; oxygen concentration ratio is set to D/(D+E); and the oxygen concentration ratios at depths of L1 nm and L2 nm from the particle surface are respectively set to $\alpha_{L1}$ and $\alpha_{L2}$, the combination of L1 and L2 in which $(\alpha_{L2}-\alpha_{L1})/\alpha_{L2} \leq 0.1$, $L1 \leq 100$, $L2 \geq 500$ is present. In order to use such lithium-containing layered nickel oxide particles, sufficient consideration has to be given to its raw materials, calcination method, handling method and the like, as a matter of course. On top of that, quality controls including examinations on the compound surface by Auger electron spectroscopy, X-ray photoelectron spectroscopy (XPS), time of flight secondary ion mass spectrometry or the like are required. In the lithium-containing layered nickel oxide. particles according to the present invention, the combination of L1 and L2 in which the value of $(\alpha_{L2}-\alpha_{L1})/\alpha_{L2}$ is less than zero may be present, and particularly, the combination of L1 and L2 equal to −0.1 or above is preferably present. It is particularly preferable that the combination of L1 and L2 in which the value of $(\alpha_{L2}-\alpha_{L1})/\alpha_{L2}$ is zero or above and 0.1 or below is present.

Figure 2:
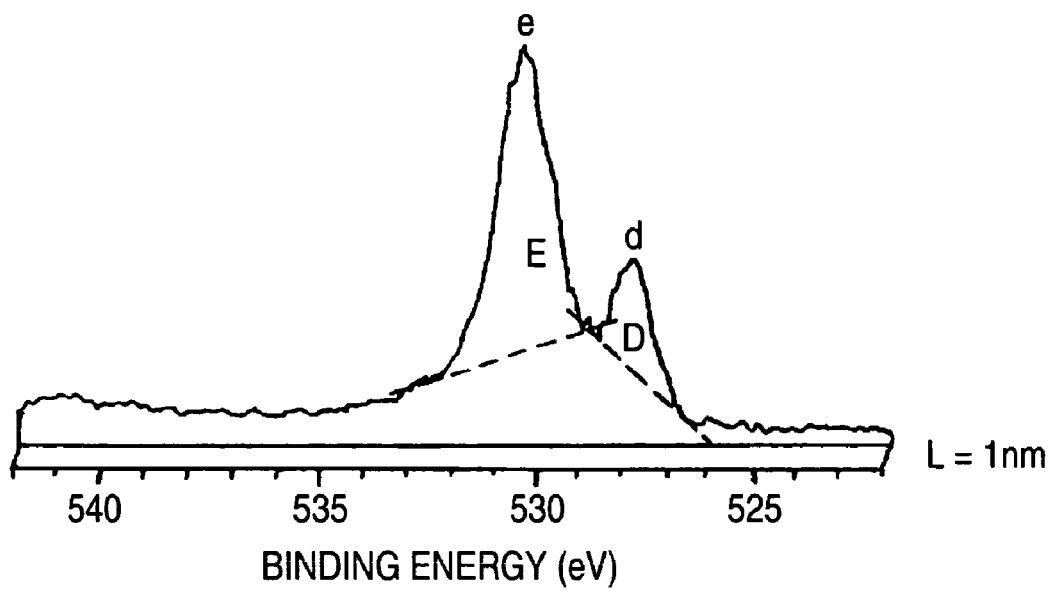
FIG. 2 shows the oxygen 1s spectrum on the particle surface (L=1 nm) in XPS.
Figure 3:
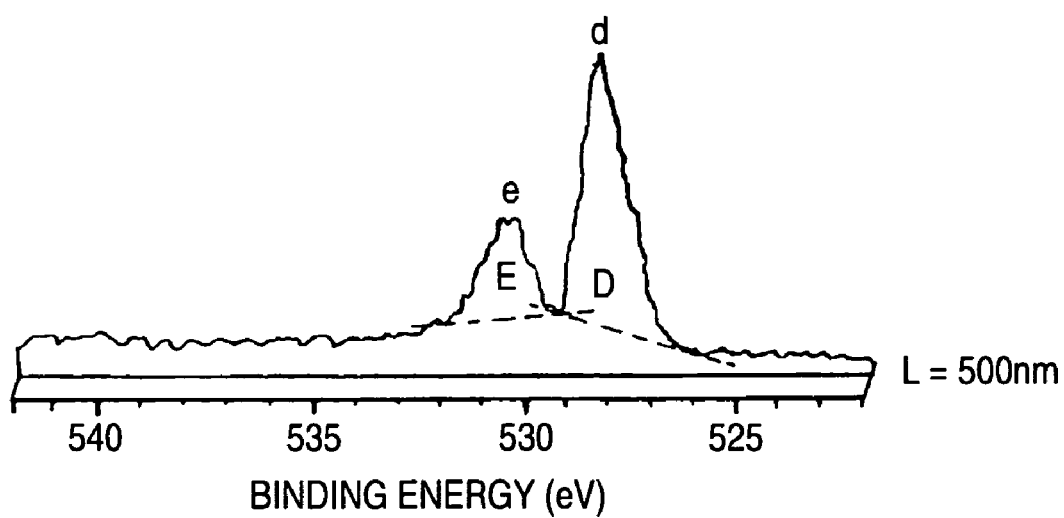
FIG. 3 shows the oxygen 1s spectrum at a depth L of 500 nm from the surface in XPS.

FIGS. 1 to 3 show an example of the oxygen 1s spectrum of conventional lithium-containing layered nickel oxide particles by XPS. FIG. 1 shows a relation between the depth L (nm) from a particle surface and the oxygen 1s spectrum when particles are argon-etched for a prescribed period of time and the XPS spectrum is then measured repeatedly. FIG. 2 shows the oxygen 1s spectrum on the particle surface (L=1 nm); and FIG. 3 shows the oxygen 1s spectrum at a depth L of 500 nm from the surface. It should be noted that there is no variation in the oxygen 1s spectrum from L=500 nm up to the core of the particle although omitted in FIG. 1. Since gases or impurities are slightly absorbed onto the surfaces of the lithium-containing layered nickel oxide particles, the spectrum after etching down to a depth of 1 nm from the outermost surface is defined as a true surface spectrum here.

In FIGS. 1 to 3, the peak d is a peak appearing at 529 eV, showing the binding energy of the oxygen 1s spectrum and the peak e is a peak appearing at 531 eV, showing the binding energy of the oxygen 1s spectrum. The peaks of the oxygen 1s spectrum are then separated. The area of the peak d is set to D; the area of the peak e is set to E; and the oxygen concentration ratio α is defined as α=D/(D+E).

As described in the reference (K. Kanamura et al. J. Electroanal. Chemistry 419 (1996) 77-84), the peak D represents oxygen contained in the crystal of $LiCoO_2$ having a layer structure, that is $O^2$ ion in the crystal; and the peak e represents the oxygen adsorbed onto the surface of the electrode. Therefore, in the XPS spectrum of the conventional lithium-containing layered nickel oxide particles shown in FIGS. 1-3, the peak d and the peak e represent the same things, and the area D of the peak d and the area E of the peak e clearly represent their oxygen concentrations respectively.

The oxygen 1s spectrum on the particle surface (L=1 nm) shown in FIG. 2 is D<E, showing that the concentration of the adsorbed oxygen is higher than the concentration of oxygen contained in the crystal. The oxygen 1s spectrum at a depth of L=500 nm from the surface shown in FIG. 3 is D>E, showing that the concentration of oxygen contained in the crystal is higher than the concentration of the adsorbed oxygen.

In the lithium-containing layered nickel oxide particles represented by the general formula $Li_aNi_xCo_yAl_zM_bO_2$ ($0.3 \leq a \leq 1.05$, $0.7 \leq x \leq 0.87$, $0.1 \leq y \leq 0.27$, $0.03 \leq z \leq 0.1$, $0 \leq b \leq 0.1$; M is at least one selected from metallic elements except Ni, Co and Al), used for the positive active material of the present invention, in the binding energy of the oxygen 1s spectrum when measuring the particles by XPS, if the peak area appearing at 529 eV is set to D; the peak area appearing at 531 eV is set to E; oxygen concentration ratio is set to D/(D+E); and the oxygen concentration ratio at depths of L1 nm and L2 nm from the particle surface are respectively set to $\alpha_{L1}$ and $\alpha_{L2}$, a combination of L1 and L2 in which $(\alpha_{L2}-\alpha_{L1})/\alpha_{L2} \leq 0.1$, $L1 \leq 100$, $L2 \geq 500$ is present.

Figure 4:
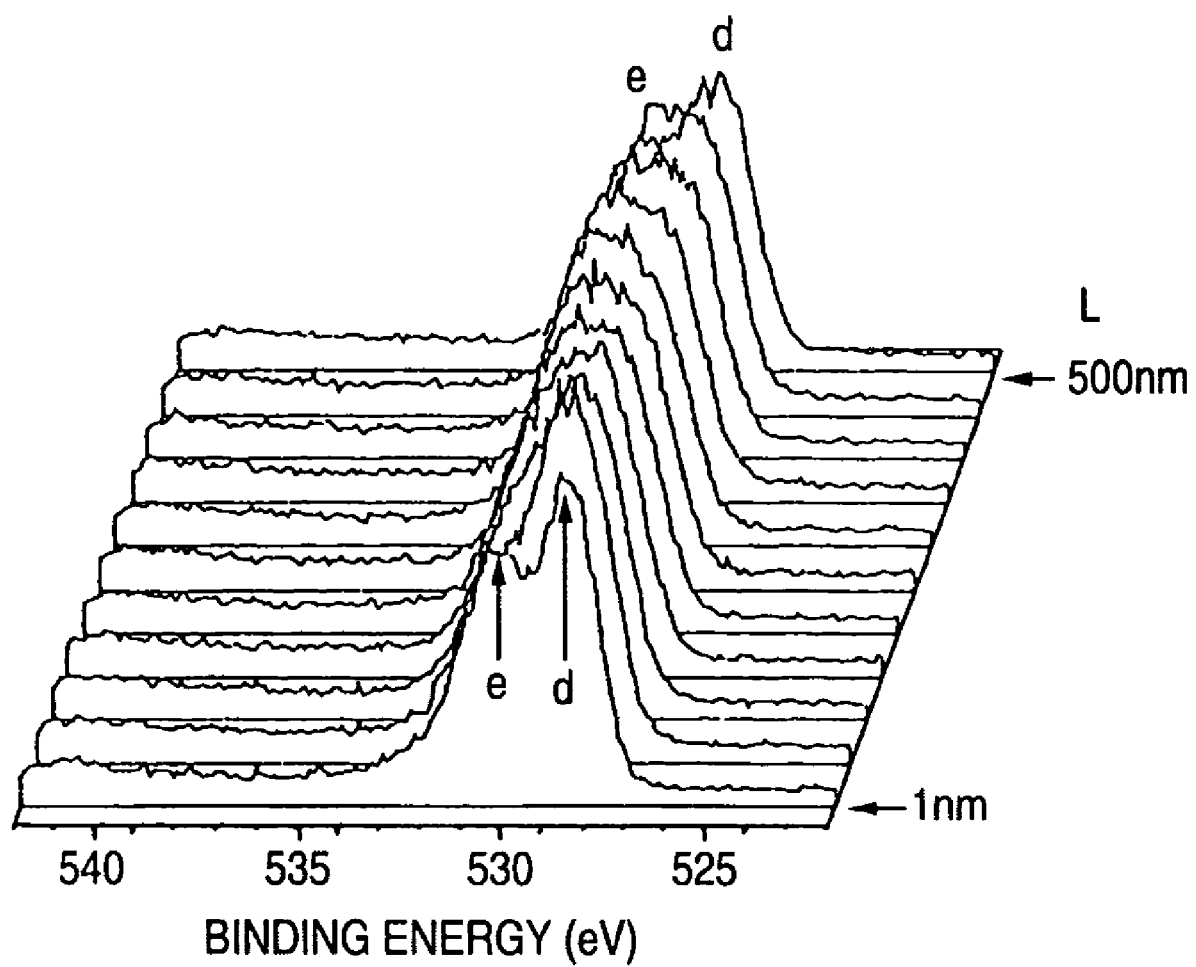
FIG. 4 shows an example of the oxygen 1s spectrum of lithium-containing layered nickel oxide particles used for positive active material of the present invention by XPS.

FIG. 4 shows an example of the oxygen 1s spectrum of lithium-containing layered nickel oxide particles used for positive active material of the present invention by XPS. In FIG. 4, both the oxygen 1s spectrum on the surface (L=1 nm) and the oxygen 1s spectrum at a depth of L=500 nm from the surface are D>E, which represents that the concentration of the oxygen contained in the crystal is higher than the concentration of oxygen adsorbed anywhere in the particle regardless of the depth from the surface.

Figure 5:
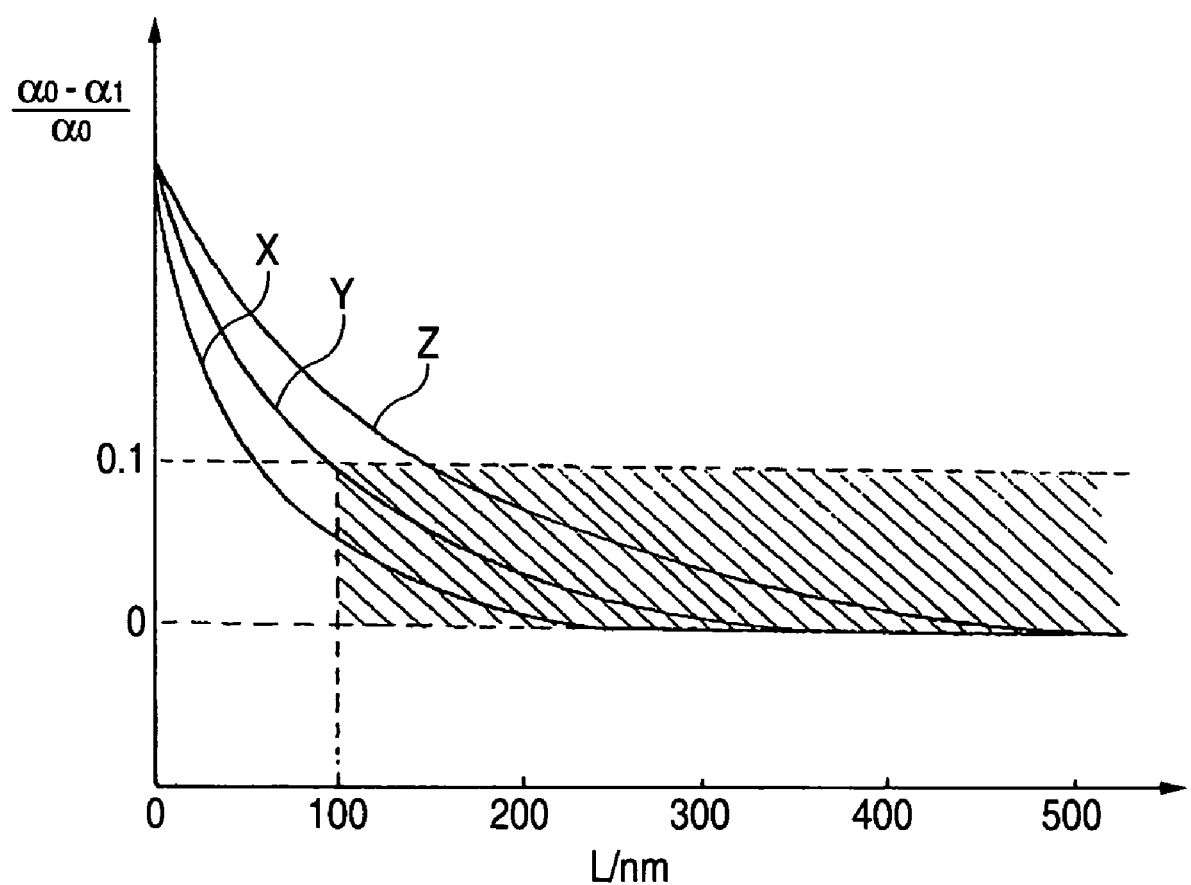
FIG. 5 shows a relation between L and $(\alpha_0-\alpha_L)/\alpha_0$ in the lithium-containing layered nickel oxide particles used for positive active material in the present invention.

FIG. 5 shows the relation between L and $(\alpha_0-\alpha_L)/\alpha_0$ in the lithium-containing layered nickel oxide particles used for positive active material according to the present invention. Here, $\alpha_0$ means $\alpha_L$ at an arbitrary depth of 500 nm or deeper from the particle surface. In the example of the figure, $\alpha_L$ is equal to $\alpha_0$ at any depth deeper than 500 nm from the surface. In this case, the lithium-containing layered nickel oxide particles used for positive active material according to the present invention has L in which $(\alpha_0-\alpha_L)/\alpha_0 \leq 0.1$ at a depth of 100 nm or below from the surface is present, to which the curves X and Y shown in FIG. 5 correspond. The lithium-containing layered nickel oxide particles shown as the curve Z in FIG. 5, having no L in which $(\alpha_0-\alpha_L)/\alpha_0 \leq 0.1$ when $100 \leq L$, is not included in the present invention. Although the curves X, Y and Z have the same value for $(\alpha_0-\alpha_L)/\alpha_0$ when L=0, the relation between the present invention and the conventional example is not limited to such a case. In the lithium-containing layered nickel oxide particles according to the present invention, generally, the value of $(\alpha_0-\alpha_L)/\alpha_0$ when L=0 is smaller than the conventional example.

The relation between L of the lithium-containing layered nickel oxide particles used for positive active material according to the present invention and $(\alpha_0-\alpha_L)/\alpha_0$ can be changed by the temperature and time for precursor calcination after forming the precursor of the lithium-containing layered nickel oxide particles and furthermore, by the atmosphere and time for storage.

The average particle size $D_{50}$ of the lithium-containing layered nickel oxide particles used for positive active material according to the present invention is preferably 4-20 μm and particularly preferably 9-10 μm. The size range of the particle is preferably 2-30 μm. The BET specific surface area of the particle is preferably 0.1-1 $m^2/g$ and particularly preferably 0.3-0.4 $m^2/g$. It should be noted that the average particle size and the particle size range were measured using the laser diffraction/scattering method and that the BET specific surface area was measured using the BET method.

Figure 6:
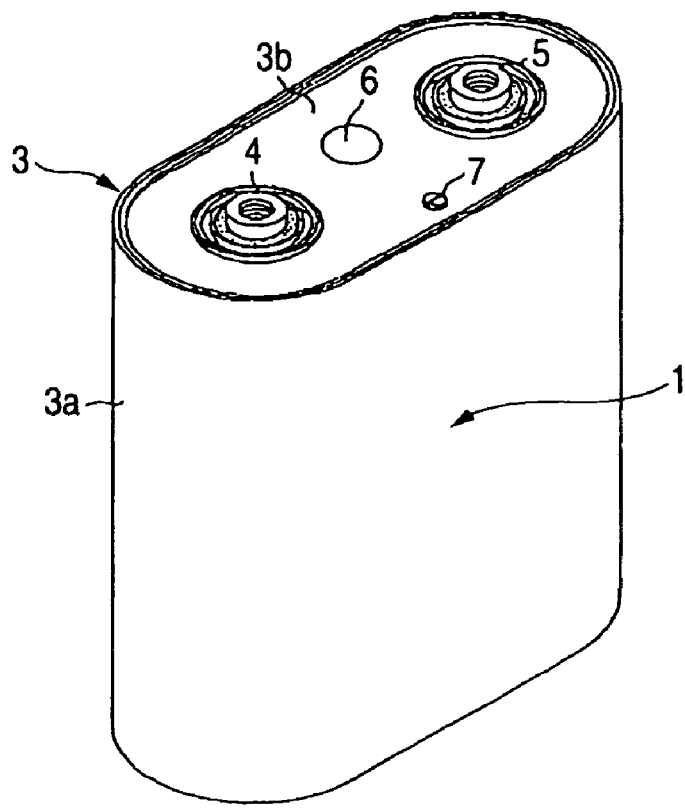
FIG. 6 is a perspective view showing an appearance of a long cylindrical nonaqueous electrolyte secondary battery.
Figure 7:
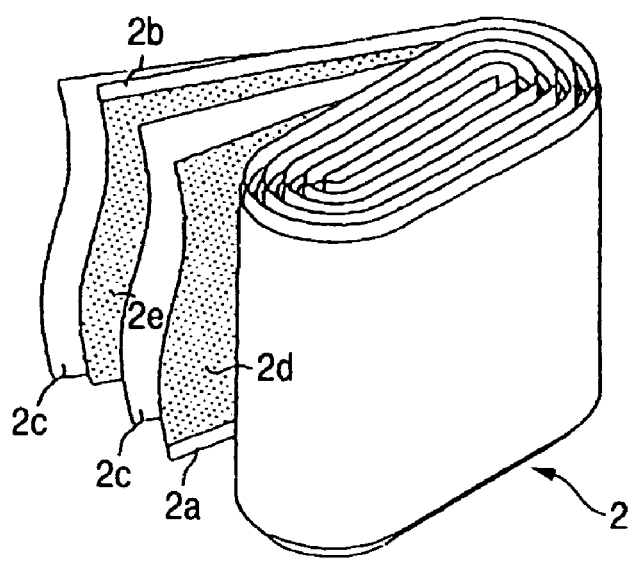
FIG. 7 is a perspective view showing a configuration of an electrode group accommodated in the long cylindrical nonaqueous electrolyte secondary battery.

The nonaqueous electrolyte secondary battery according to the present invention, as shown in FIG. 6 and FIG. 7, is configured by accommodating an electrode group formed by winding positive and negative electrodes using the compound described above for positive active material into a circle or ellipse through a separator, in a battery case; and by impregnating the electrode group with nonaqueous electrolyte.

FIG. 6 is a perspective view showing an appearance of a long cylindrical nonaqueous electrolyte secondary battery; and FIG. 7 is a perspective view showing a configuration of the electrode group accommodated in the long cylindrical nonaqueous electrolyte secondary battery. In FIG. 6 and FIG. 7, reference numeral 1 denotes a nonaqueous electrolyte secondary battery; 2 a power generating element; 2a a positive electrode; 2b a negative electrode; 2c a separator; 3 a battery case; 3a a case of the battery case; 3b a lid of the battery case; 4 a positive electrode terminal; 5 a negative electrode terminal; 6 a safety valve; and 7 an electrolytic solution inlet.

For the negative electrode, separator, electrolyte and the like to be used for the nonaqueous electrolyte secondary battery, conventional ones which have been used normally can be used, since there is no particular difference. Specifically, for the material of the negative electrode of the nonaqueous electrolyte secondary battery according to the present invention, various carbon materials capable of absorbing and desorbing lithium ions, metallic lithium, lithium alloy or the like can be used. Transition metal oxides or nitrides may also be used.

Also, for the separator used for the nonaqueous electrolyte secondary battery according to the present invention, a microporous film composed of a polyolefin resin such as polyethylene is used. The separator may be composed by laminating a plurality of microporous films different in material, average molecular weight and porosity, or by applying a proper amount of an additive such as various plasticizers, anti-oxidants and fire retardant to the microporous films.

The organic solvent of the electrolytic solution used for the nonaqueous electrolyte secondary battery according to the present invention is not limited to a specific one. For example, ethers, ketones, lactones, nitrites, amines, amides, sulfur compound, halogenated hydrocarbons, esters, carbonates, nitro compound, phosphate-based compounds and sulfolane-based hydrocarbons can be used. Among them, ethers, ketones, esters, lactones, halogenated hydrocarbons, carbonates and sulfolane-based compounds are preferable. The examples of the preferable organic solvent include tetrahydrofuran, 2-methyltetrahydrofuran, 1,4-dioxane, anisole, monoglyme, 4-methyl-2-pentanone; ethyl acetate, methyl acetate, methyl propionate, ethyl propionate, 1,2-dichloroethane, γ-butyrolactone, dimethoxyethane, methyl formate, dimethyl carbonate, methyl ethyl carbonate, diethyl carbonate, propylene carbonate, ethylene carbonate, vinylene carbonate, dimethyl formamide, dimethyl sulfoxide, dimethylthioformamide, sulfolane, 3-methyl-sulfolane, trimethyl phosphate, triethyl phosphate and a mixture of these solvents, but not limited to the above examples. Cyclic carbonates and cyclic esters are preferable. One organic solvent selected from ethylene carbonate, propylene carbonate, methyl ethyl carbonate and diethyl carbonate, or a mixture of two or more selected therefrom is most preferable.

The examples of the electrolyte salt used for the nonaqueous electrolyte secondary battery according to the present invention, not being limited to a specific one, include $LiClO_4$, $LiBF_4$, $LiAsF_6$, $CF_3SO_3Li$, $LiPF_6$, $LiN(CF_3SO_2)_2$, $LiN(C_2F_5SO_2)_2$, LiI, $LiAlCl_4$ and a mixture thereof. One lithium salt selected from $LiBF_4$ and $LiPF_6$ or a mixture of two or more selected therefrom is preferable.

Furthermore, for the above electrolyte, a solid, ion conductive polymer electrolyte can be used as supplement. In this case, examples of the configuration of the nonaqueous electrolyte secondary battery include the combination of a positive electrode, a negative electrode and a separator with an organic or inorganic solid electrolyte and the above nonaqueous electrolytic solution; and the combination of an organic or inorganic solid electrolyte film as a positive electrode, a negative electrode and a separator with the above nonaqueous electrolytic solution. The polymer electrolyte film composed of polyethylene oxide, polyacrylonitrile, polyethylene glycol, the modified body thereof, or the like, is lightweight, flexible and advantageous in using for a winding electrode plate. Furthermore, in addition to polymer electrolyte, inorganic solid electrolyte or a mixed material of organic polymer electrolyte with inorganic solid electrolyte can be used.

Other Examples of the battery components include a current collector, a terminal, an insulating plate and a battery case. Also for these parts, those which have been conventionally employed can be used for the present invention without modification.

EXAMPLES

Hereinafter, a description is given for Examples 1-4 and Comparative Examples 1-3 according to the present invention.

Example 1

[Preparation of Lithium-containing Layered Nickel Oxide Particles]

Nickel sulfate and cobalt sulfate were dissolved in a prescribed composition ratio; and aqueous sodium hydroxide was then added thereto while agitating sufficiently so as to obtain nickel-cobalt combined coprecipitation hydroxide. The formed coprecipitate was washed with water, dried and fully mixed with aluminum hydroxide; then lithium hydroxide monohydrate salt was added thereto; adjustment was made so that the molar ratio between lithium and nickel+cobalt+aluminum would be 1.05:1 so as to prepare the precursor.

Next, the precursor was calcinated under an oxygen atmosphere at 700° C. for 20 hours; cooled down to the room temperature; and taken out in dried argon gas to be crushed, so that the lithium-containing layered nickel oxide particles represented by the compositional formula $Li_{1.03}Ni_{0.85}Co_{0.12}Al_{0.03}O_2$ were obtained. It should be noted that the obtained lithium-containing layered nickel oxide particles were stored in a desiccator in air at 0.1 atm for three months. The average composition of the obtained lithium-containing layered nickel oxide particles was analyzed by the inductively coupled plasma spectrometry method. In the powder X-ray diffraction, the peak of unreacted hydroxide or impurities such as lithium aluminate was not found.

The average particle size $D_{50}$ of the obtained lithium-containing layered nickel oxide particles was 9.5 μm and the particle size range was 15 μm, which were measured by the laser diffraction/scattering method. The BET specific surface area was 0.35 $m^2/g$, which was measured using BET method.

Next, in order to examine the surface properties of the obtained lithium-containing layered nickel oxide particles, a qualitative analysis was carried out from the compound surface toward the inside in the depth direction using the X-ray photoelectron spectroscopy method (XPS) and argon-ion etching in combination.

The analysis was carried out in the following procedure. First, the lithium-containing layered nickel oxide particles were applied onto a conductive carbon tape placed on a sample stage for the X-ray photoelectron spectroscopy method in a drying room at a dew point of −50° C. or below. A stainless steel plate having a clean surface was put thereon and pressed moderately using a hydraulic presser so as to prepare a visually flat and dense sample.

Next, the above sample was put in an X-ray photoelectron spectroscopy apparatus using a transfer vessel so as not to be exposed to air. Since the analysis area diameter of the X-ray photoelectron spectroscopy method was set to 100 μmΦ, the spectrum to be obtained was the average value obtained from several tens of compound particles. Nevertheless, although several tens of operations were repeatedly performed using the identical compound from the sample preparation operation up to the X-ray photoelectron spectroscopy measurement operation, no error was included in the obtained information.

Since gases or impurities are slightly adsorbed onto the outermost surface of the lithium-containing layered nickel oxide particles, the spectrum after etching down to a depth of 1 nm from the outermost surface is defined as a true surface spectrum of the lithium-containing layered nickel oxide particle surface here. The depth was computed by converting based on the thickness of single-crystal Si.

The successive analysis of the lithium-containing layered nickel oxide particle surface was carried out on the flat plate on which powder was aggregated and pressed as described above. Even when the same analysis is carried out on a polar plate formed by mixing the lithium-containing layered nickel oxide particles with acetylene black or poly(vinylidene fluoride), and by applying the mixture onto a flat plate followed by pressing, since oxygen is not contained in acetylene black and poly(vinylidene fluoride), there is no trouble in specifying the lithium-containing layered nickel oxide particle surface and determining the oxygen chemical bond state on the surface. Specifically, the same analysis can be carried out on the polar plate.

FIG. 4 shows the oxygen 1s spectrum of the obtained lithium-containing layered nickel oxide particles. FIG. 4 shows that both the oxygen 1s spectrum on the surface (L=1 nm) and the oxygen 1s spectrum at a depth of L=500 nm from the surface are D>E, which represents that the concentration of the oxygen contained in the crystal is higher than the concentration of oxygen adsorbed anywhere in the particle regardless of the depth from the surface. It should be noted that there was no variation in oxygen concentration ratio at a depth of 500 nm or inner.

[Preparation of Test Battery]

A positive electrode was prepared by mixing the above lithium-containing layered nickel oxide particles of 87 weight %, acetylene black of 5 weight % and poly(vinylidene fluoride) (PVdF) of 8 weight %; adding N-methyl-2-pyrrolidone (hereinafter, referred to as "NMP") with a water content of 50 ppm or below to the mixture to make a paste; applying the paste onto an aluminum foil leaf; and drying to form a positive electrode plied material layer. A negative electrode was prepared by mixing carbon material (graphite) with PVdF; adding NMP to the mixture to make a paste; applying the paste onto a copper foil leaf; and drying to form a negative electrode plied material layer.

The belt-like positive and negative electrodes thus prepared were wound into an ellipse through a separator so as to form an electrode group as shown in FIG. 2, and the electrode group was then inserted into the long cylindrical, closed-end aluminum case. After filling the core of the electrode group with filling material, electrolytic solution was injected thereinto and the case was sealed with the lid by laser welding. It should be noted that all the processes from paste preparation, electrode formation up to battery assembly were carried out under a dried condition at a dew point of 50° C. or below.

[Characteristic Test]

After charging the test battery with a current of 1CA up to 4.2V, the discharge capacity was measured when discharging with a current of 1 CA up to 3.0 V so as to compute the initial discharge capacity of positive active material per g.

Next, the discharge capacity was found after charging-discharging 300 cycles under the same charge-discharge conditions as the test battery so as to compute after-cycle capacity retention. It should be noted that the "after-cycle capacity retention (%)" here means the value obtained by dividing the discharge capacity after 300 cycles by the initial discharge capacity.

Furthermore, comparisons regarding preserving characteristics were made with another battery prepared at the same time as the battery used in the charge-discharge cycle test. Initially, after the charge-discharge process was repeated three times in which charge was carried out with a current of 1 CA up to 4.2V followed by discharging with a current of 1 CA up to 3.0V, the third discharge capacity was set to the initial discharge capacity. Next, after charging again with a current of 1 CA up to 4.2V, the battery was stored under a condition of 60° C. for 10 days. After the storage period, the charge-discharge process was repeated three times under the same condition as the initial processes, and the third discharge capacity was set to the after-storage discharge capacity so as to compute the after-storage capacity retention. It should be noted that the "after-storage capacity retention (%)" here means the value obtained by dividing the after-storage discharge capacity by the initial discharge capacity.

Example 2

A precursor was prepared similarly to Example 1. The precursor was calcinated in an oxygen atmosphere at 700° C. for 20 hours; cooled down to the room temperature; and then taken out in dried argon gas to be crushed, so that the lithium-containing layered nickel oxide particles represented by the compositional formula $Li_{1.03}Ni_{0.85}Co_{0.12}Al_{0.03}O_2$ were obtained. The obtained lithium-containing layered nickel oxide particles were stored in a desiccator in a vacuum for a month. XPS measurement and battery characteristic measurement were then carried out similarly to Example 1.

Example 3

The lithium-containing layered nickel oxide particles represented by the compositional formula $Li_{1.03}Ni_{0.85}Co_{0.12}Al_{0.03}O_2$ were obtained similarly to Example 2 except that a precursor was calcinated in an oxygen atmosphere at 700° C. for 5 hours. Storage, XPS measurement and battery characteristic measurement were then carried out under the same conditions as in Example 1.

Example 4

The lithium-containing layered nickel oxide particles represented by the compositional formula $Li_{0.03}Ni_{0.85}Co_{0.12}Al_{0.03}O_2$ were obtained similarly to Example 2 except that a precursor was calcinated in an oxygen atmosphere at 650° C. for 20 hours. Storage, XPS measurement and battery characteristic measurement were then carried out under the same conditions as in Example 1.

Comparative Example 1

A precursor was calcinated and crushed under the same conditions as in Example 2 so as to obtain the lithium-containing layered nickel oxide particles represented by the compositional formula $Li_{1.03}Ni_{0.85}Co_{0.12}Al_{0.03}O_2$. After storing the precursor in a desiccator in a vacuum for 12 months, XPS measurement and battery characteristic measurement were carried out under the same conditions as in Example 1.

Comparative Example 2

A precursor was prepared similarly to Example 1. The precursor was calcinated in an oxygen atmosphere at 700° C. for 20 hours; cooled down to the room temperature; taken out in dried argon gas; and then crushed in a dried atmosphere, so that the lithium-containing layered nickel oxide particles represented by the compositional formula $Li_{1.03}Ni_{0.85}Co_{0.12}Al_{0.03}O_2$ were obtained. The obtained lithium-containing layered nickel oxide particles were stored in a desiccator in a vacuum for a month. XPS measurement and battery characteristic measurement were then carried out similarly to Example 1.

Comparative Example 3

The same precursor as in Example 1 was calcinated and crushed under the same conditions as in Example 2 so as to obtain the lithium-containing layered nickel oxide particles represented by the compositional formula $Li_{1.03}Ni_{0.85}Co_{0.12}Al_{0.03}O_2$. The particles were stored in air at 1 atm for one month. Storage, XPS measurement and battery characteristic measurement were then carried out under the same conditions as in Example 1.

Based on the XPS measurement result of the lithium-containing layered nickel oxide particles used in Examples 1-4 and Comparative Examples 1-3, Table 1 shows the value of the oxygen concentration ratio $\alpha_L$ at a depth of L (nm) from the surface; and Table 2 shows the value of $(\alpha_0-\alpha_L)/\alpha_0$ at a depth of L (nm) from the surface. It should be noted that the value for $\alpha_L$ did not vary in the depth range of 500 nm or above from the surface in any of Examples and Comparative Examples. Therefore, the value for $\alpha_L$ at a depth of L=500 nm was set to $\alpha_0$. Also, the result of the battery characteristic measurement is shown in Table 3.

TABLE 1

| | Value $\alpha_L$ at depth L (nm) from particle surface | | | |
|---|---|---|---|---|
| | L = 10 | L = 50 | L = 100 | 500 |
| Example 1 | 49 | 68 | 74 | 80 |
| Example 2 | 49 | 70 | 77 | 81 |
| Example 3 | 47 | 69 | 75 | 81 |
| Example 4 | 48 | 68 | 74 | 80 |
| Comparative Example 1 | 41 | 62 | 70 | 81 |
| Comparative Example 2 | 38 | 55 | 64 | 80 |
| Comparative Example 3 | 35 | 49 | 60 | 81 |

TABLE 2

| | Value $(\alpha_0 - \alpha_L)/\alpha_0$ at depth L (nm) from particle surface | | | |
|---|---|---|---|---|
| | 10 | 50 | 100 | 500 |
| Example 1 | 0.388 | 0.135 | 0.075 | 0 |
| Example 2 | 0.395 | 0.136 | 0.049 | 0 |
| Example 3 | 0.420 | 0.148 | 0.074 | 0 |
| Example 4 | 0.400 | 0.150 | 0.075 | 0 |
| Comparative Example 1 | 0.494 | 0.235 | 0.136 | 0 |
| Comparative Example 2 | 0.525 | 0.313 | 0.200 | 0 |
| Comparative Example 3 | 0.568 | 0.395 | 0.259 | 0 |

TABLE 3

| | Initial discharge capacity Ah | After-cycle capacity retention % | After-storage capacity retention % |
|---|---|---|---|
| Example 1 | 192 | 80 | 89 |
| Example 2 | 191 | 81 | 90 |
| Example 3 | 190 | 81 | 90 |
| Example 4 | 188 | 82 | 91 |
| Comparative Example 1 | 188 | 78 | 88 |
| Comparative Example 2 | 188 | 77 | 86 |
| Comparative Example 3 | 187 | 77 | 87 |

Based on the results shown in Tables 1-3, in the lithium-containing layered nickel oxide particles whose composition is represented by the general formula $Li_aNi_xCo_yAl_zO_2$ ($0.3 \leq a \leq 1.05$, $0.7 \leq x \leq 0.87$, $0.1 \leq y \leq 0.27$, $0.03 \leq z \leq 0.1$; b=0 in this case), it was found that battery performance varies depending on difference in surface properties typified by oxygen chemical bond state even when using a compound having the identical composition. Specifically, as in the batteries of Examples 1-4, in the binding energy of the oxygen 1s spectrum when measuring the particles by XPS, if the peak area appearing at 529 eV is set to D; the peak area appearing at 531 eV is set to E; oxygen concentration ratio is set to D/(D+E); and the oxygen concentration ratio at depths of L1 nm and L2 nm from the particle surface are respectively set to $\alpha_{L1}$ and $\alpha_{L2}$, in case the combination of L1 and L2 in which $(\alpha_{L2}-\alpha_{L1})/\alpha_{L2} \leq 0.1$, $L1 \leq 100$, $L2 \geq 500$ is present, superior battery performance can be obtained both in after-cycle capacity retention and after-storage capacity retention.

On the other hand, Comparative Examples 1-3, where there is no combination of L1 and L2 in which $(\alpha_{L2}-\alpha_{L1})/\alpha_{L2} \leq 0.1$, $L1 \leq 100$, $L2 \geq 500$, were inferior in both after-cycle capacity retention and after-storage capacity retention.

The following has become clear after the above examinations. Since the performance of the battery using Ni-based compound for positive active material undergoes a sensitive reaction in the properties of the compound surface, quality control is necessary on the surface in order to obtain a good battery performance as expected, which can be determined based on whether or not oxygen chemical bond state is within a stipulated range.

Although the present invention has been described in detail with reference to the specific examples, it should be understood by those skilled in the art that various changes and modifications may be made therein without deviating from the spirit and scope of the present invention.

This application is based on the Japanese Patent Application No.2003-348728 filed on Oct. 7th, 2003. The entire disclosure of the specification is incorporated herein by reference.

INDUSTRIAL APPLICABILITY

As has been described above, since the after-cycle capacity retention and after-storage capacity retention of a nonaqueous electrolyte secondary battery improve thanks to the present invention, the present invention has a significant industrial applicability.

The invention claimed is:

1. A nonaqueous electrolyte secondary battery which comprises a positive electrode including particles of lithium-containing layered nickel oxide represented by a general formula $Li_aNi_xCo_yAl_zM_bO_2$, wherein:
   $0.3 \leq a \leq 1.05$, $0.7 \leq x \leq 0.87$, $0.1 \leq y \leq 0.27$, $0.03 \leq z \leq 0.1$, $0 \leq b \leq 0.1$; M is at least one selected from metallic elements except Ni, Co and Al, and
   in binding energy of oxygen 1s spectrum when measuring said particles by XPS, if a peak area appearing at 529 eV is set to D; a peak area appearing at 531 eV is set to E; oxygen concentration ratio is set to D/(D+E); and oxygen concentration ratios at depths of L1 nm and L2 nm from the particle surface are respectively set to $\alpha_{L1}$ and $\alpha_{L2}$, a combination of L1 and L2 in which $(\alpha_{L2}-\alpha_{L1})/\alpha_{L2} \leq 0.1$, $L1 \leq 100$, $L2 \geq 500$ is present.

2. The nonaqueous electrolyte secondary battery according to claim 1, wherein said particles are crushed in an argon-gas atmosphere.

3. The nonaqueous electrolyte secondary battery according to claim 1, wherein average particle size $D_{50}$ of said particles is 4-20 μm.

4. The nonaqueous electrolyte secondary battery according to claim 3, wherein the average particle size $D_{50}$ of said particles is 9-10 μm.

5. The nonaqueous electrolyte secondary battery according to claim 1, wherein BET specific surface area of said particles is 0.1-1 $m^2/g$.

6. The nonaqueous electrolyte secondary battery according to claim 5, wherein the BET specific surface area of said particles is 0.3-0.4 $m^2/g$.

7. The nonaqueous electrolyte secondary battery according to claim 1, wherein a combination of L1 and L2 in which $-0.1 \leq (\alpha_{L2}-\alpha_{L1})/\alpha_{L2} \leq 0.1$, $L1 \leq 100$, $L2 \geq 500$ is present.

8. The nonaqueous electrolyte secondary battery according to claim 7, wherein the combination of L1 and L2 in which $0 \leq (\alpha_{L2} - \alpha_{L1})/\alpha_{L2} \leq 0.1$, $L1 \leq 100$, $L2 \geq 500$ is present.

9. The nonaqueous electrolyte secondary battery according to claim 1, wherein $0.98 \leq x+y+z+b \leq 1.01$.

10. The nonaqueous electrolyte secondary battery according to claim 1, wherein M is a transition metal element except Ni and Co.

* * * * *